United States Patent

Spanton et al.

[15] 3,662,923
[45] May 16, 1972

[54] FEEDING PARTICULATE MATERIAL

[72] Inventors: Robert George Spanton; Gordon Cecil John Wakefield; Robert Charles Quarmby; Terence James Leonard Clarke, all of Leicester, England

[73] Assignee: The British United Shoe Machinery Company Limited, Leicester, England

[22] Filed: Nov. 27, 1970

[21] Appl. No.: 93,217

[30] Foreign Application Priority Data

Dec. 3, 1969 Great Britain......................58,961/69

[52] U.S. Cl..............................................................222/55
[51] Int. Cl..................................................G01f 11/00
[58] Field of Search...................222/55, 282, 290, 305, 307, 222/342, 408, 409

[56] References Cited

UNITED STATES PATENTS

| | | | |
|---|---|---|---|
| 2,324,574 | 7/1943 | Gans | 222/342 X |
| 2,432,852 | 12/1947 | Arvidson | 222/407 X |
| 2,990,873 | 7/1961 | Fahrni | 222/290 X |

Primary Examiner—Robert B. Reeves
Assistant Examiner—Thomas E. Kocovsky
Attorney—W. Bigelow Hall and Richard A. Wise

[57] ABSTRACT

The invention relates to feeding particulate material, especially a machine for and method of feeding particulate material wherein a conveying surface and an opening from a hopper containing particulate material to be metered are first moved relatively, the conveying surface moving relatively forward, at a comparatively slow speed commensurate with the rate of flow of material from the hopper onto the surface to spread a layer of particulate material on the surface, the layer having a thickness controlled by the spacing of control means from the conveying surface, and then again relatively moved, the conveying surface being moved rearwardly relative the opening and the layer being prevented, or substantially from moving rearwardly so that particulate material falls from the front edge of the surface. The length of stroke of the conveying surface is adjusted so that the amount of particulate material falling from the front edge of the conveying surface is the same for each forward and rearward cycle of the surface.

10 Claims, 6 Drawing Figures

Patented May 16, 1972

FIG_4

Fig_6

FEEDING PARTICULATE MATERIAL

BACKGROUND OF THE INVENTION

In various fields of industry there is a desire to feed particulate material at a measured rate, for example particulate plastics material in the form of powder granules or flake to hoppers of injection molding machines, food granules to livestock, powder in the pharmaceutical industry and the like. Furthermore it is sometimes necessary to mix several different types of particulate material in controlled proportions to obtain a desired blend e.g. masterbatch coloring with uncolored plastics material to obtain a desired shade of plastics. It is important for some applications that the proportions of each particulate material in a mixture be controlled within fairly close limits and numerous ways of achieving such control have been proposed, for example batch weighing and various types of volumetric devices.

In one method of feeding particulate materials practiced heretofore particulate material has been held in a stationary hopper and fed through an opening therefrom onto a conveying surface which has been oscillated forwardly and rearwardly at high speed, e.g. 50 cycles per second, the surface being part of a trough reciprocated by electrical means at the frequency of AC mains. In such a method the thickness of the layer of particulate material has been adjusted by adjusting the distance between the vibrating conveying surface and a metering blade whereby to control the quantity of material falling from the front edge of the surface. It has been found that using such a method the quantity of material fed in a given time e.g. for a period of about a quarter of a minute cannot be controlled very accurately. For example, where plastics pellets are to be metered e.g. to mix with the other plastics pellets in desired proportions for feeding to an injection molding machine, it has proved difficult to meter desired quantities to within ±5 percent by weight over a period of about a quarter of a minute; where powders are to be fed, the powders have tended to be dispersed into the atmosphere and again it has proved difficult to meter to within ±5 percent.

SUMMARY OF THE INVENTION

It is one of the various objects of the present invention to provide an improved method of and machine for feeding particulate material.

With the above and other objects in view as will hereinafter appear, the present invention in one aspect thereof contemplates a method of metering discrete quantities of particulate material comprising relatively moving a horizontal or substantially horizontal conveying surface and an opening from a hopper containing material to be metered such that the conveying surface moves forwardly relative to the opening to spread a layer of particulate material on the surface, the layer being of a thickness controlled by spacing of control means from the surface, the material being fed onto the surface at a rate commensurate with the rate of forward movement of the conveying surface, and thereafter relatively moving the conveying surface and the opening such that the conveying surface moves rearwardly relative to the opening the layer being prevented from moving rearwardly so that particulate material falls from the front edge of the surface.

Preferably the rate of acceleration and deceleration of the conveying surface during forward movement thereof is controlled so that no slipping between the layer and surface takes place.

Another of the objects of the invention is to provide a machine for carrying out a method as set out in the last preceding paragraph but one and to this end is provided a machine comprising a frame, a hopper having an opening therefrom mounted in the frame, a conveyor mounted for horizontal reciprocating movement on guide means mounted on the frame with a conveying surface of the conveyor disposed beneath the opening, drive means for reciprocating the conveyor at a relatively slow rate between a foremost position and a rearmost position, control means comprising a control member mounted on the frame above and extending across the conveying surface to control the thickness of the layer of particulate material carried on the surface and means extending across the conveying surface for preventing rearward movement of the layer of particulate material on the conveying surface.

There now follows a detailed description, to be read with reference to the accompanying drawings, of a method of and machine for metering discrete quantities of particulate material, illustrative of the invention. It will be realized that the illustrative machine and the illustrative method have been selected for description to illustrate the invention by way of example and not of limitation. The features of this invention may be employed in various and numerous embodiments without departing from the scope of the invention.

DESCRIPTION OF THE PREFERRED EMBODIMENT

The illustrative proportioning and mixing machine comprises a main first feed unit 20 connected with auxiliary second and third feed units 22 and 24. Each of the feed units comprises a frame 26 on which is mounted a hopper 28 from which particulate material may be metered by a metering device 30 through valve means 32 into a conveyor pipe 34.

Figure 1:
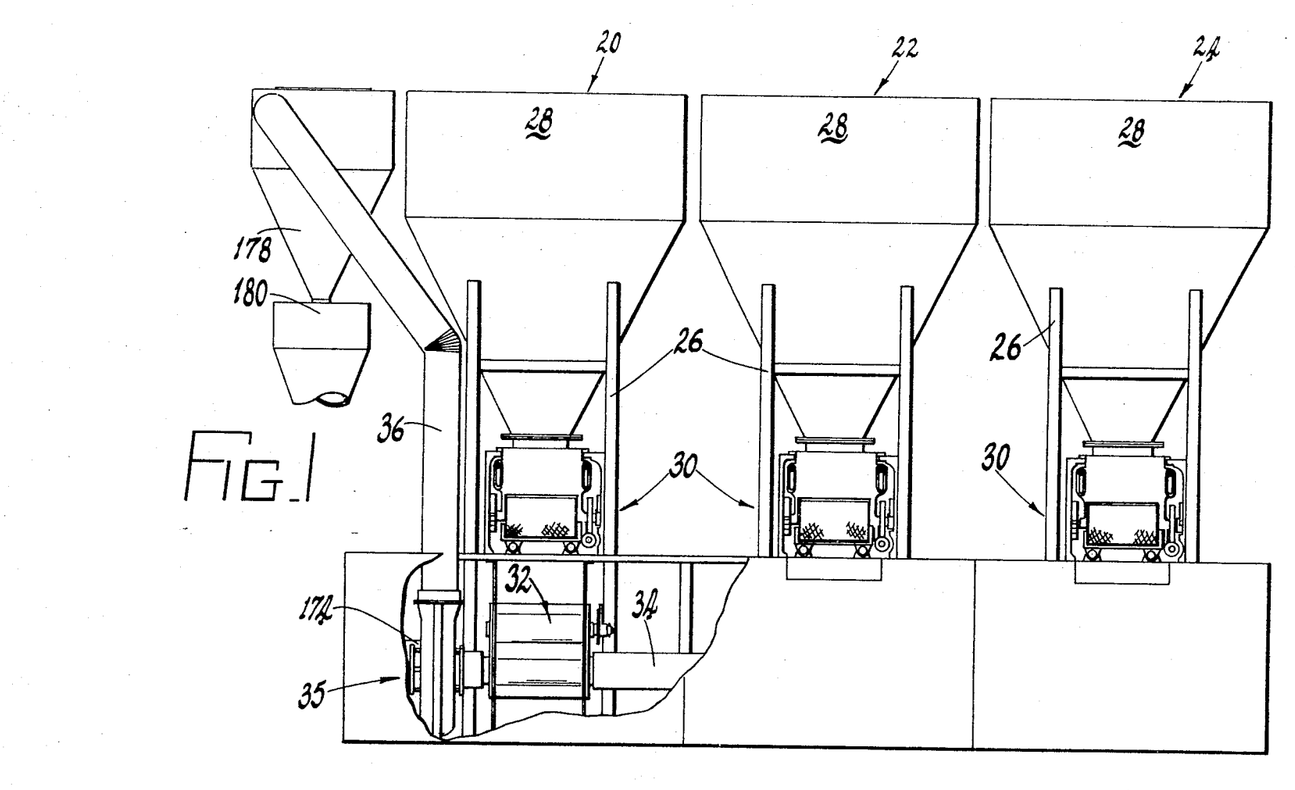
FIG. 1 is a view of an illustrative proportioning and mixing machine showing three metering viz. feed units connected together to form an illustrative proportioning machine.

The hoppers 28 are pivotally mounted on the frames 26 such that the hoppers 28 may be pivoted to tip particulate material from the top (as seen in FIG. 1) of the hopper into a container disposed in front of the unit of which the hopper is a part. A lower, outlet portion (as seen in FIG. 1) will be withdrawn from an upper portion of the associated metering device 30, as the hopper is tipped, and may be closed, to prevent leakage therefrom, by a metal plate mounted for sliding movement across the outlet portion between a position in which the outlet is closed and a position in which it is open.

The units 20, 22 and 24 are positioned with the pipe 34 thereof in alignment and secured together to provide a conveying pipe of the illustrative machine. The hopper 28, metering device 30 and valve means 32 of the feed units 22 and 24 are similar in construction and operation to the first, main illustrative feed unit 20 and will not therefore be described in detail herein; the illustrative feed unit 20 comprises a blower unit 35, arranged to create a current of air in the pipes 34 to convey particulate material deposited from the hopper in the pipes 34 along the pipes 34, through the blower unit 35 in which the particulate material is thoroughly mixed and out through an outlet pipe 36 to a storage hopper.

Figures 2, 3:
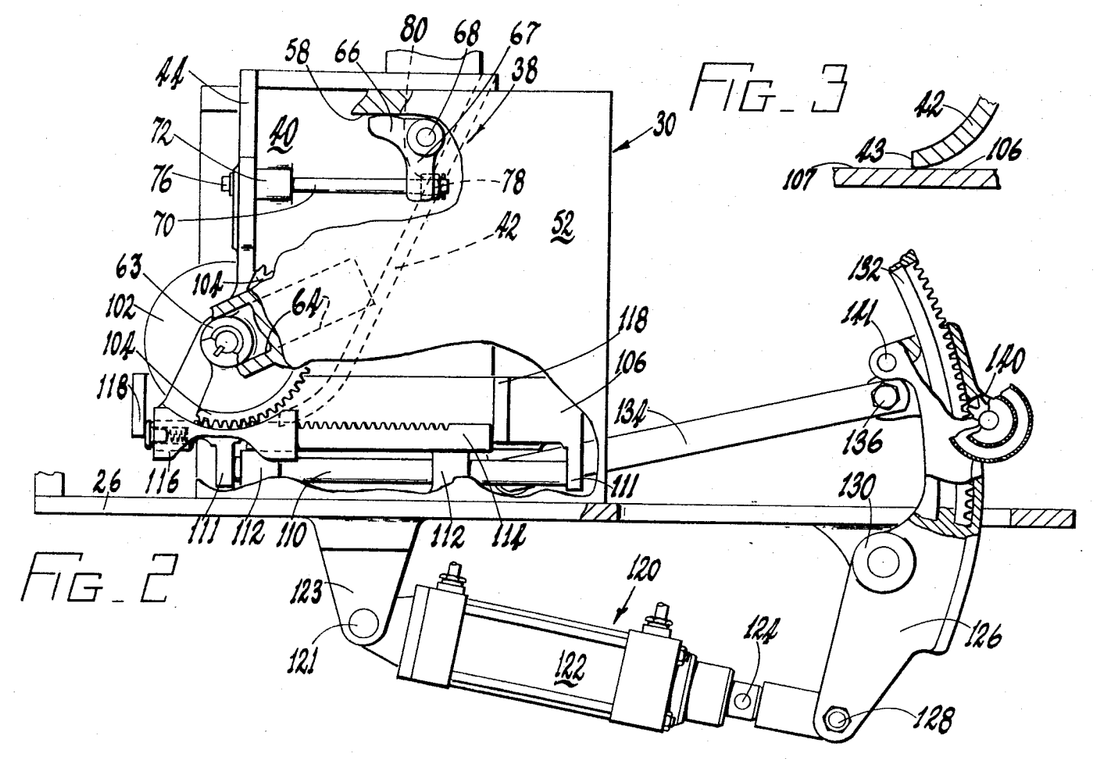
FIG. 2 is a side view of a part of one illustrative feed unit.
FIG. 3 is a side view of part of this illustrative feed unit with parts broken away to show an outlet portion of a hopper.
Figure 4:
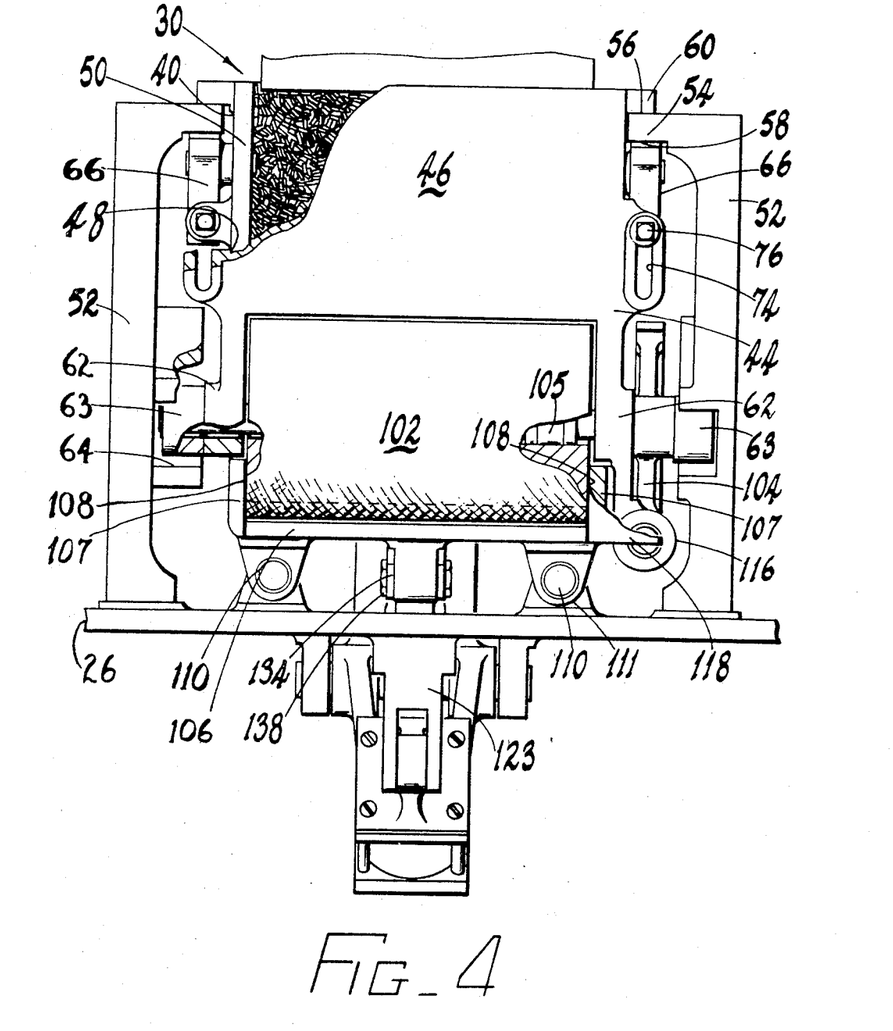
FIG. 4 is a front view of the feed unit shown in FIG. 2.

The illustrative feed unit 20, as hereinbefore mentioned, comprises the frame 26, on which is mounted the hopper 28 with its lower outlet end opening (viewing FIGS. 1, 2 and 4 of the drawings) into an upper portion of the metering device 30. Referring now to FIGS. 2, 3 and 4, the metering device 30 comprises a hopper 38 comprising parallel side plates 40 lying vertically and from front to rear of the unit, a sloping rear plate 42 extending between the side plates and secured thereto and a front member 44. The front member 44 comprises a vertical plate portion 46 having parallel grooves 48 in a rear face thereof and vertical front edges 50 of the side plates 40 are received in the grooves 48 so that the member 44 can slide up and down relative to the side plates 40.

The hopper 38 is supported by two brackets 52 secured to the frame 26. Each bracket 52 has, at an upper end portion thereof a supporting rib 54, and each rib 54 has a horizontal upper bearing surface 56 and a horizontal lower bearing surface 58; the ribs 54 are directed inwardly towards each other. Each of the side plates 40 comprises at an upper end portion thereof an outwardly directed rim 60 a lower surface of which is arranged to seat on the upper bearing surface 56 of the associated rib 54; the rims 60 are slideable on the ribs 54 forwardly and rearwardly of the unit 20.

The front member 44 has two bosses 62 one projecting to the left and one to the right of the member 44. A shaft 100 extends horizontally across the hopper 38 and is mounted for rotation in bearings in the bosses 62; end portions of the shaft 100 project beyond the bosses 62. Rolls 63 are mounted for free rotation on the projecting end portions of the shaft 100. Each of the rolls 63 is received in an associated inclined groove 64 in an inner surface of the adjacent one of the brackets 52. The grooves 64 extend from front to rear of the illustrative unit 20 inclined upwardly at an angle of 27½° to the horizontal.

The front member 44 and side plates 40 of the hopper 38 are arranged to be locked in position by clamping means comprising a pair of bell crank levers 66, 67 each pivotally mounted on an associated one of the plates 40 on a pivot pin 68 projecting outwardly therefrom. Each of the bell crank levers is generally similar in construction and operation and only one (shown in FIG. 2) will, for convenience, be described hereinafter. A limb 66 of the bell crank lever is in engagement with the lower bearing surface 58 of an associated one of the support ribs 54 and a limb 67 is connected with the front member 44 by a rotatable shaft 70 (see FIG. 2). A front end portion of the shaft 70 is mounted for rotation in a bush 72 secured to the adjacent side plate 40 for vertical sliding movement in a slot 74 (see FIG. 4) and a stud portion 76 of the shaft 70 projects forwardly from the bush 72. A rear end portion of the shaft 70 is screw threaded into a nut 78 housed in a recess 80 in a rearwardly directed portion of the limb 67; the shaft 70 extends through an enlarged bore in the limb 67, to the nut 78. The nut 78 is prevented from rotating by engagement with walls of the recess 80 and a shoulder at the junction of said enlarged bore with the recess prevents the nut 78 being drawn forwardly in the limb 67.

A cylindrical, steel roll 102 about 3½ inches in diameter and having a knurled surface, is mounted on the shaft 100. A gear segment 104 is keyed to the shaft between the boss 62 and roll 63 on the right of the illustrative unit 20 (viewing FIG. 4). The roll 102 is operatively connected to the shaft 100 by a one way clutch 105 e.g. a Torrington roller clutch, so that rotation of the gear segment 104 in a clockwise sense, viewing FIG. 2, drives the shaft 100 and thus, through the clutch 105, the roll 102 in a clockwise sense, while the shaft 100 when rotated in an anti clockwise sense freewheels in the roll 102, the roll 102 remaining stationary.

A rigid, steel tray 106 is mounted beneath the roll 102 with vertical sides 107 thereof in sliding contact with vertical left and right faces 108 of the roll 102. The tray 106 is mounted for forward and rearward sliding reciprocation in the illustrative unit 20. Two rails 110 are secured beneath the tray (two brackets 111, one at each end of the rail holding the associated rail 110 spaced from the bottom of the tray) and are slidingly received in bearing bushes 112, (two for each rail) secured to the frame 26. A rack 114 is mounted to the right of the tray, viewing FIG. 4, in mesh with the gear segment 104 so that forward and rearward movement rotates the gear segment correspondingly. The rack 114 is mounted for sliding movement in a bearing bush 116 secured to the frame 26. A projection 118 from the rear of the tray is in engagement with a rear end face of the rack 114 and a similar projection 118 from the front of the tray is in engagement with a spring-urged plunger 119 slidingly received in a front end portion of the rack 114 so that forward and rearward reciprocation of the tray 106 similarly reciprocates the rack 114; the plunger 119 is intended to take up any backlash between the rack 114 and projections 118. Forward movement of the tray 106, and thus the rack 114, rotates the segment 104 in a clockwise sense viewing FIG. 2 and thus rotates the roll 102 in a similar sense, while rearward movement of the tray 106 of rack 114 rotates the segment 104 in an anticlockwise sense, the shaft 100 freely rotating in the roll 102 and the roll 102 thus remaining stationary. The construction and arrangement is such that when the roll 102 is being rotated by forward movement of the tray 106, the surface speed of the roll 102 adjacent the surface of the tray 106 is the same as the forward speed of the tray 106.

The tray 106 is arranged to be reciprocated in the operation of the illustrative unit 20 by a fixed-stroke pneumatic piston-and-cylinder motor 120 (see FIG. 2) through an adjustable linkage by which the stroke of the tray 106 may be adjusted.

A lower portion of the rear plate 42 of the hopper 38 is curved and has approximately the same radius of curvature as the roll 102. The hopper 38 extends across the width of the tray 106 and sides of the tray 106 are in sliding contact with the side plates 40 of the hopper 38. The rear plate 42 of the hopper 38 terminates in a vertical face 43 (see FIG. 3) about three-eighths inch high and extending across the width of the tray 106; a lower edge portion of this face is in sliding contact with the upper conveying surface of the tray 106.

The motor 120 comprises a cylinder 122 pivotally mounted on a horizontal, transverse pivot pin 121 carried by a bracket 123 secured to the frame 26, and a piston rod 124 projecting rearwardly from an end portion of the cylinder 122 opposite that at which the cylinder is mounted on the bracket 123. A rear end portion of the piston rod 124 is pivotally connected with a lower end portion of a casting 126 of the adjustable linkage by means of a pivot pin 128. The casting 126 is mounted for pivotal movement about a pivot pin 130 carried by a bracket secured to the frame 26 and parallel with the pin 121. The casting 126 has a channel portion of T-shape cross-section opening generally forwardly and is generally in the form of an arc. A rack 132 also in the form of an arc of similar radius to the radius of the casting 126 is slidingly received in the channel portion of the casting with teeth thereof sliding on a surface (part of a cylinder) of the casting 126. A rear end portion of a link 134 is pivoted on a pin 136 mounted on the rack 132 and a front end portion of the link 134 is pivoted on a pin 138 mounted on the tray 106. A pinion 140 is rotatably mounted in the casting with teeth thereof in mesh with the teeth of the rack. Rotation of the pinion 140 adjusts the position of the rack 132 along the channel portion of the casting 126 and the pinion 140 may be locked in position to retain the rack in an adjusted position in the casting 126.

The construction and arrangement of the unit 20 is such that when the piston rod is in a fully retracted position in the cylinder 122 the casting 126 is thus in a fully clockwise position viewing FIG. 2 and the tray 106 is in a rearmost position, then the distance from the pin 138 to the arc of the rack is the same as the radius of the arc. Thus the rearmost position of the tray 106 is the same no matter what the adjustment of the rack 132 in the casting 126. However adjustment of the rack in the casting moves the pin 136 towards or away from the pivot pin 130, and when the motor 120 is operated to extend the piston rod 124 from the cylinder 122 on its fixed stroke the distance through which the pin 136 (and thus the link 134, pin 140 and tray 106) moves is dependent on the adjustment of the rack 132 in the casting 126. The foremost position to which the tray 106 may be moved on operation of the motor 122 may thus be adjusted by means of the rack 132 and pinion 140 but the rearmost position of the tray 106 is fixed. Adjustment of the rack 132 in the casting 126 is limited by a stop peg 141 and the pivot pin 130 which are engaged by part of the rack, the peg 141 for maximum stroke of the tray 106 and the pin 130 for minimum stroke.

A mouth 142 is disposed beneath a front edge of the tray 106 such that material falling from the front edge of the tray falls into the mouth 142, whether the tray is adjusted for maximum or minimum stroke. Material falling into the mouth 142 enters the valve means 32 of the illustrative unit.

The valve means 32 of the illustrative unit 20 comprises a cylindrical valve chamber 144 disposed above the pipe 34 of the unit 20 with its axis lying parallel to the pipe 34 and with an opening 146, extending along the length of a lower portion of the chamber 146, between the chamber and the pipe 34. The valve means 32 further comprises a valve member 148 rotatably mounted in the chamber 144. The valve member 148 comprises a spindle 150 end portions of which are journalled for rotation in bearings in end plates 152 by which open ends of the chamber 144 are closed: the spindle 150 lies on the axis of the chamber 144. The valve member 148 also comprises four radial vanes 154 mounted on the spindle 150 disposed at 90° intervals therearound and extending the length of the chamber 144; the vanes 154 have flexible rubber end portions 156 arranged to seal on the cylindrical surface of the chamber 144. The valve member 148 is arranged to be rotated in the operation of the illustrative unit, by a pneumatic motor 158.

Figure 5:
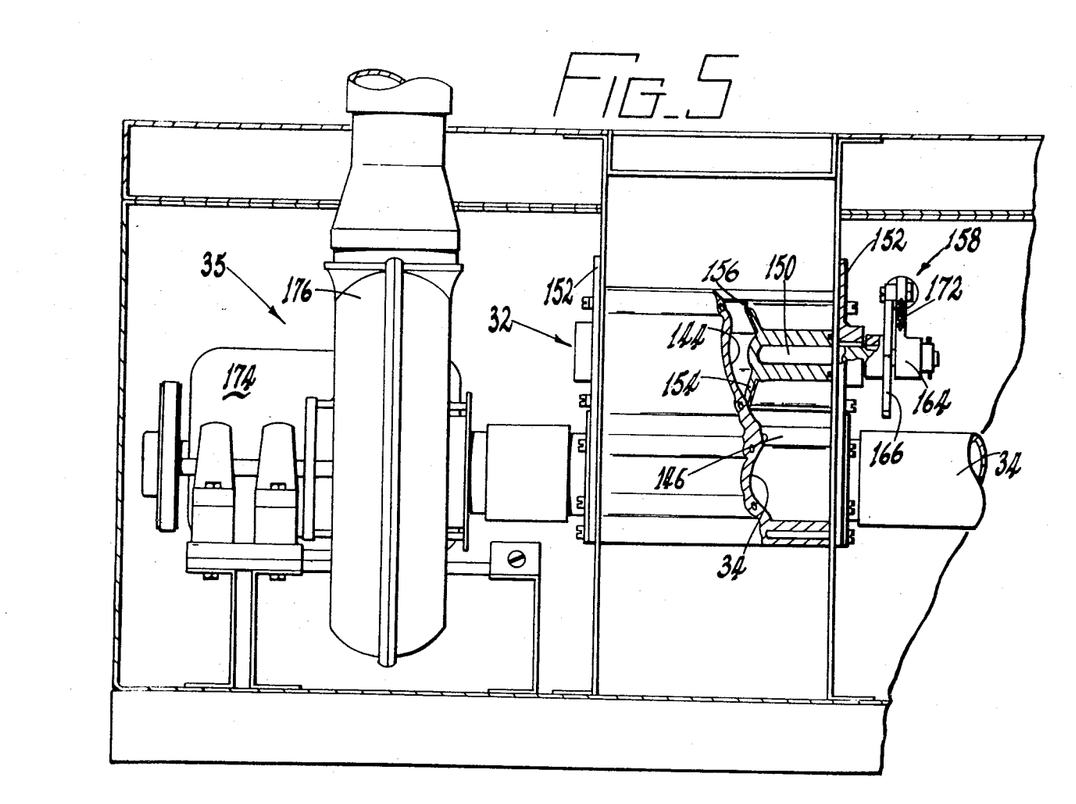
FIG. 5 is a view showing a blower unit, conveyor pipe and valve means of the illustrative feed unit shown in FIG. 2.

The pneumatic motor 158 comprises a cylinder 160, a rear end portion of which is pivotally mounted on the frame 26 and a piston rod 162 projecting forwardly from the cylinder 160. A front end portion of the piston rod 162 is pivotally connected to an outer end portion of a lever 164 an inner end portion of which is mounted for free rotation on an end portion of the spindle 150 projecting to the right (viewing FIG. 5) of the right one of the end plates 152. A ratchet wheel 166 is keyed to said end portion of the spindle 150 between the right one of the end plates 152 and the lever 164. The ratchet wheel has four teeth each having a face 168 adapted to be engaged by a pawl 170; the faces 168 are disposed at 90° intervals round the wheel 166. The pawl 170 is pivoted on the lever 164 and is urged in an anticlockwise sense by a spring 172 extending between the pawl 170 and the lever 164.

Figure 6:
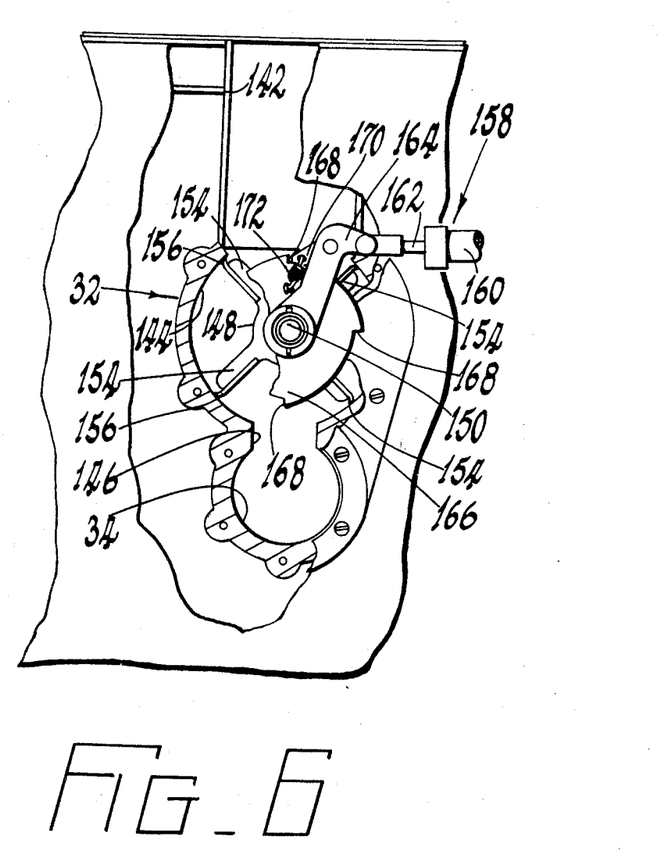
FIG. 6 is a view of the valve means of the feed unit shown in FIG. 5.

In the operation of the valve means air is supplied to the motor 160 to drive the piston rod 162 forwardly (through a fixed stroke) and the pawl 170 engages one of the faces 168 and drives the ratchet wheel 166 (and thus the valve member 148) in an anticlockwise sense viewing FIG. 6. On retraction of the piston rod 162 and pawl 170 slides over the ratchet wheel 166 until it engages behind another of the faces 168. The construction and arrangement of the valve means 32 is such that for one forward and rearward stroke of the piston rod 162 the ratchet wheel 166 and the valve member 148 are rotated through 90° and the relationship of the valve member 148 to the motor 158 and ratchet wheel 166 is such that at the termination of the rearward portion of each stroke, i.e. at the normal rest position of the valve means 32, two adjacent ones of the vanes 154 subtend the mouth 142 as shown in FIG. 6. At all times the valve member 148 ensures that there is no direct communication between the mouth 142 and pipe 34.

The blower unit 35 of the illustrative unit 20 comprises an electric motor 174 arranged, in the operation of the illustrative unit 20, to continuously drive a fan (not shown) mounted in a fan housing 176. The fan is arranged, in the operation of the illustrative unit 20, to draw air through the pipe 34 and force it out through the outlet pipe 36 into a cyclone 178 to which the outlet pipe is connected. Air drawn through the pipe 34 carries with it any particulate material which has been deposited in the pipe 34 by the valve means 32 and carries it along the outlet pipe 36 to the cyclone 178 where the air and particulate material are separated by the cyclone 178. The particular material falls from the cyclone 178 into a storage hopper 180, for example a storage hopper of an injection molding machine. The cyclone 178 is similar in operation to known cyclones for similar purposes. However, many such cyclones also act as storage hoppers: this has been found impractical where the cyclone is used to separate air and fine particulate material e.g. powder because the circulating air in the cyclone tends to lift powder collected at the bottom of the hopper and carry it out with the expelled air into the atmosphere. It has been found that the separate hopper 180 disposed beneath the cyclone 178 cuts down the loss of powder with expelled air: the diameter of the hopper 180 adjacent the outlet portion from the cyclone 178 is considerably greater than the diameter of the outlet portion. A level determining device is fitted to the hopper 180.

In the operation of the illustrative feed unit 20 the hopper 28 is first filled with a particulate material to be fed, e.g. plastics granules for an injection molding machine, and particulate material flows from the hopper 28 into the hopper 38 of the metering device 30 and out on to the tray 106 until no more flows from the hopper to the tray and the hopper 38 is full. The tray 106 of the metering device of the illustrative feed unit 20 is normally in a rest condition at the rearmost portion of its stroke with the piston rod 124 fully retracted in the cylinder 122 as it is shown in FIG. 2 and the valve means 32 is also normally at rest with the valve members 148, motor 158 and lever 164 as shown in FIG. 6; the motor 174 is running continuously when the unit 20 is ready for operation.

Upon actuation, for example by a signal received from the level sensing device in the hopper 180 to which the illustrative feed unit is feeding material, air is supplied to operate the motors 120 and 158, simultaneously to drive the piston rods 124, 162 from the cylinders 122, 160 on a stroke of fixed length. The motor 120 is designed so that the beginning and end of the movement of the piston rod 124 is cushioned to avoid severe acceleration or deceleration and thus undue jarring during either forward or rearward movements of the tray 106 especially at the beginning and end thereof where such jarring is most likely to take place. Each forward stroke and each rearward stroke of the tray takes about 1 second. Operation of the motor in this way drives the tray 106 forward to an extent determined by adjustment of the rack 132 in the casting 126 and forward movement of the tray 106 rotates the roll 102; as hereinbefore mentioned such movement of the roll 102 and tray 106 draws particulate material from the hopper 38, the material being carried on the upper surface of the tray 106 forwardly beneath the roll 102. As the tray 106 moves forwardly, the motor 158 drives the valve member 148 in an anticlockwise sense so that the valve member rotates through 90°, the sector between adjacent vanes 154 initially open to the mouth 142 being rotated to face left viewing FIG. 6, the sector initially facing left being rotated to open the opening 146 to the pipe 34, and the sector initially open to the pipe 34 being rotated to face right and the sector initially facing right being rotated so that it is open to the mouth.

Upon completion of the outward stroke of the piston rods 124, 162 air is supplied to the motors to retract the piston rods 124, 162 into the cylinders 122, 160. As the piston rod 124 is retracted the tray 106 moves rearwardly to its rearmost position but the roll 102 remains stationary, the roller clutch freewheeling as hereinbefore mentioned and the particulate material drawn forwardly during forward movement of the tray remains substantially stationary as the tray 106 moves rearwardly: both friction between the roll 102 and the particulate material and the buffer effect of the vertical face 43 of the rear plate 42 of the hopper 38 help to maintain the particulate material stationary. As the tray 106 moves rearwardly particulate material falls off the front edge of the tray and is caught by the operator in a suitable container: this is necessary on the first stroke of the tray because the quantity of material on the tray initially after the hopper 38 has been filled is indeterminate. As the piston rod 162 is retracted the pawl 170 rides over the ratchet wheel 166 which remains stationary.

Upon completion of retraction of the piston rods 124, 162 the motors 120, 158 are again operated to drive the tray 106 forwardly to feed particulate material from the hopper and rotate the valve member 148, and then to drive the tray rearwardly to discharge particulate material from the front edge of the tray 106: on this occasion the particulate material is allowed to fall into the mouth 142 of the valve means assuming that the metering device 30 has previously been set to deliver a desired quantity of material. If the metering device 30 has not been set to deliver a desired amount then the material delivered as the tray is moved rearwardly is collected by the operator and weighed (or its quantity otherwise determined). The amount of material fed during a single stroke of the tray is then adjusted if necessary, to deliver more or less material, as desired and the amount delivered on the next stroke is again measured and further adjustment made, if necessary: this procedure is repeated until a desired quantity of material is delivered on each rearward stroke of the tray 106.

When the quantity delivered has been set the material delivered as allowed to fall into the mouth 142 and is received in the sector (between two of the vanes 154) open to the mouth 142 i.e. facing upwardly. During the next forward movement of the tray 106 this sector is rotated by the motor 158 so that it occupies the left position (viewing FIG. 6) and an empty sector is open to the mouth 142: this empty sector is then filled with material discharged from the tray during the next rearward movement. On the next forward movement of the tray the first sector reaches a downward facing position and discharges its material through the opening 146 into the pipe 34. On each forward stroke of the tray 106 thereafter a sector delivers its charge of particulate material to the pipe 34 and on each rearward stroke of the tray a further sector is filled until the supply of particulate material ceases. Particulate material delivered to the pipe is carried in a current of air sucked along the pipe 34 by the fan of the blower unit and blown along the outlet pipe 36 into the cyclone 178 nd thence delivered to the storage hopper 180 hereinbefore mentioned. When the hopper 180 is sufficiently filled the level sensing device signals this and the motors 120 and 158 cease to operate: the sensing device re-starts the motors when the level of material in the hopper 180 has fallen to a pre-selected level.

If desired, means may be provided whereby an operator may actuate the unit to operate the tray and valve means through 1 cycle, i.e. through 1 forward and reverse movement of the tray 106 and rotation of the valve member 148 through 90°.

The illustrative feed unit 20 is so constructed and arranged that the front edge of the tray 106, when it is in its rearmost position and the roll 102 is touching the upper surface of the tray, is three-fourths inch from the line of contact of the tray with the roll. The forward stroke of the tray may be adjusted with the rack 132 so that the front edge of the tray moves a maximum of 2 inches or a minimum of 0 inches forward during operation of the motor 120 the degree of forward movement may be adjusted between these limits by the rack: adjustment of the stroke by this means gives fine control over the quantity of particulate material fed by the metering device 30 in 1 cycle of the tray 16.

Coarse adjustment of the quantity of material fed may be obtained by adjusting the height of the roll 102 above the upper surface of the tray thereby adjusting the thickness of the material fed out of the hopper 38 between the roll 102 and tray during forward movement of the tray 106. The height of the roll 102 may be changed by first rotating the shafts 70 anticlockwise viewing FIG. 4 thus rotating the bellcrank levers 66, 67 anticlockwise viewing FIG. 2 and releasing the limb 66 from the lower surface of the support rib 54. The hopper 38 including the front plate 44 may now be slid on the upper surface 56 of the support rib 54 carrying the roll 102 with it. Movement of the hopper 38 and the roll 102 rearwardly causes the rolls 63 to ride rearwardly and upwardly in the grooves 64 thus raising the roll 102 and front plate 44 (the front edges 50 of the side plates 40 riding in the grooves 48 and the bushes 72 sliding freely in the slots 74). Forward movement of the hopper 38 and roll 102 causes the rolls 63 to ride forwardly and downwardly in the grooves 64 thus lowering the roll 102 and front plate 44. When the roll 102 has been moved to a desired position the shafts 70 are rotated in a clockwise sense viewing FIG. 4 (by means of a suitable key engaged with the stud portion 76) to screw the rear end portions thereof into the nuts 78 and rotate the bellcrank levers 66,67 in a clockwise sense viewing FIG. 2 thus forcing the limb 66 against the lower bearing surface 58 of the rib 54 and clamping the rim 60 down on to the upper bearing surfaces 56: the front plate 44 is by this action clamped firmly against the front edges 50 of the side plates 40. The hopper 38 and roll 102 are thus locked firmly in position. The height of the lowest point of the roll 102 above the upper surface of the tray 106 may be set at any distance from zero (as hereinbefore mentioned) up to 1 inch and as the roll is raised it is also moved rearwardly by an amount dependent on the angle of the grooves 63.

It is necessary to have the hopper 38 and roll 102 some distance away from the front edge of the tray 106 so that material from the hopper cannot flow straight out of the hopper 38 and over the front edge of the tray: this distance increases as the height of the roll 102 above the tray increases. It also appears that if the roll 102 is set at a fixed distance to the rear of the front edge of the tray 106, sufficient to accommodate the height range through which the roll 102 can be adjusted above the tray so that whatever the height of the roll 102 above the tray particulate material does not flow from the hopper 38 and over the front edge of the tray (except on operation of the unit to feed material) then with some particulate materials during movement of the tray and layer of material between the roll 102 and front edge instead of remaining a uniform thickness (in which it was fed from the hopper) tends to form a heap of varying height thus introducing a potential source of inaccuracy in the quantity of particulate material dispensed at each cycle of the unit. This effect has only appeared significant where the roll has been set to feed only a small amount from the hopper at each cycle of the unit i.e. a thin layer of particulate material, and it has been found that the tendency to form a heap can be eliminated or substantially reduced if, when thin layers of material are to be fed, the roll and hopper are set as near as possible to the front edge of the tray. The minimum distance of three-fourths inch hereinbefore mentioned has been found suitable when feeding any of a wide variety of particulate material using the illustrative unit 20 in that the heaping is eliminated, or substantially reduced, while yet particulate material does not flow from the hopper over the front edge of the tray when a very thin layer of material is being fed and it has been found that heaping is avoided, or substantially reduced, while yet material does not flow straight from the hopper off the tray, if the roll is moved rearwardly as it is moved upwardly to increase the thickness of the layer of particulate material at the angle of about 27° (hereinbefore mentioned to the horizontal (assuming that the upper surface of the tray is mounted for movement along a horizontal plane).

The illustrative unit has been found to feed a wide variety of particulate materials, over a wide range of weight fed per cycle, to an accuracy of ±1 percent by weight or better in the case of many materials and weights per cycle. The illustrative unit is intended to operate at approximately 30 feeding cycles per minute; however, provided that acceleration and deceleration of the tray is set such that no undue slipping takes place between the tray and the particulate material the movement of the tray may take place at any rate. Undue slipping will probably result in loss of accuracy.

The feed units 22 and 24 are generally similar in construction and operation to the unit 20 (except that neither has a blower unit) and therefore will not be described in detail herein. As hereinbefore mentioned the feed units are mounted side by side with the pipes 34 thereof in alignment and connected. The end of the pipe 34 of the unit 24 opposite that at which it is connected to the pipe 34 of the unit 22 is open to atmosphere. The blower unit 35 draws air through all of the pipes 34 to carry particulate material deposited therein by valve means 32 of the units 20, 22 and 24 to the outlet pipe 36 and along this to the cyclone 178. The valve means 32 of the units 20, 22, 24 are arranged in the operation of the illustrative proportioning machine to operate in synchronism so that charges of particulate material measured by the metering devices of the units are deposited in the pipe substantially simultaneously and the materials are mixed during travel along the pipes 34, passage through the blower unit 35, travel along the pipe 36 and through the cyclone 178. Should a number of similar feed units be arranged in series it may be necessary to time the operation of each so that the valve means are not operated simultaneously but at such time intervals that a charge of particulate material from each feed unit arrives at the blower unit at the same moment as a charge from each of the other feed units.

Where a very small quantity of material is required from one feed unit to be mixed with a large quantity from another unit e.g. mixing a masterbatch particulate colorant with uncolored particulate plastics material then a feed unit having a tray and feed roll of narrow width may be used to feed the small quantity. Where very large quantities of particulate material are to be mixed with average quantities of other materials two or more feed units may be engaged in feeding said one particulate material.

Having thus described our invention, what we claim as new and desire to secure by Letters Patent of the United States is:

1. A method of metering discrete quantities of particulate material comprising relatively moving a horizontal or substantially horizontal conveying surface and an opening from a hopper containing material to be metered such that the conveying surface moves forwardly relative to the opening to spread a layer of particulate material on the surface, the layer being of a thickness controlled by spacing of control means from the surface, the material being fed onto the surface at a rate commensurate with the rate of forward movement of the conveying surface, and thereafter relative moving the conveying surface and the opening such that the conveying surface moves rearwardly relative to the opening the layer being prevented from moving rearwardly so that particulate material falls from the front edge of the surface.

2. A machine comprising a frame, a hopper having an opening therefrom mounted in the frame, a conveyor mounted for horizontal reciprocating movement on guide means mounted on the frame with a conveying surface of the conveyor disposed beneath the opening, drive means for reciprocating the conveyor at a relatively slow rate between a foremost position and a rearmost position, control means comprising a control member mounted on the frame above and extending across the conveying surface to control the thickness of the layer of particulate material carried on the surface and means extending across the conveying surface for preventing rearward movement of a layer of particulate material on the conveying surface.

3. A machine for mixing a plurality of particulate materials comprising a plurality of machines according to claim 2 for feeding a plurality of particulate materials, collecting means for collecting material falling from a front edge of each of the conveyors and means linking the drive means so that measured quantities of such particulate material collected by the collecting means are delivered to a mixing region in synchronism.

4. A machine according to claim 2 wherein the means extending across the conveying surface comprises a vertical stop face at the rear of the opening from the hopper.

5. A machine according to claim 2 comprising means for adjusting the distance between the foremost and rearmost positions of the conveyor.

6. A machine according to claim 5 wherein the rearmost position is fixed.

7. A machine according to claim 2 wherein the control member is a roll rotatable about an axis parallel with the conveying surface disposed adjacent the opening from the hopper.

8. A machine according to claim 7 comprising means for driving the roll in rotation when the conveying surface is moved forwardly such that the rotating roll has a surface speed adjacent the surface equal to the speed of the conveying surface and for not rotating the roll when the conveying surface is moved rearwardly, the rotation of the roll during forward movement assisting feeding of particulate material from the hopper into the layer and the roll, when stationary, militating against rearward movement of the layer as the surface is moved rearwardly.

9. A machine according to claim 7 wherein means is provided for adjusting the height of the roll above the surface to adjust the thickness of the layer of particulate material carried forwardly by the surface.

10. A machine according to claim 9 wherein the roll is raised by moving supports for the roll rearwardly.

* * * * *